May 29, 1962 E. H. MEIER ETAL 3,037,186
VARIABLE DENSITY SEISMIC SECTION PRINTER
Original Filed Oct. 29, 1953 5 Sheets-Sheet 1

Edwin H. Meier
James J. Roark
Jesse D. Skelton
Gerald M. Webster   Inventors

By *James A. Reilly*   Attorney

Edwin H. Meier
James J. Roark
Jesse D. Skelton
Gerald M. Webster   Inventors

By James A. Reilly   Attorney

Edwin H. Meier
James J. Roark
Jesse D. Skelton
Gerald M. Webster          Inventors By *James A. Reilly* Attorney May 29, 1962 E. H. MEIER ETAL 3,037,186
VARIABLE DENSITY SEISMIC SECTION PRINTER
Original Filed Oct. 29, 1953 5 Sheets—Sheet 5

A   B   C

ORIGINAL RECORDS   PORTION OF PRINTED SEISMIC SECTION

Edwin H. Meier
James J. Roark
Jesse D. Skelton
Gerald M. Webster   Inventor

By *James A. Reilly*   Attorney

United States Patent Office 3,037,186
Patented May 29, 1962

3,037,186
VARIABLE DENSITY SEISMIC SECTION
PRINTER
Edwin H. Meier, Los Angeles, Calif., and James J. Roark, Jesse D. Skelton, and Gerald M. Webster, Tulsa, Okla., assignors to Jersey Production Research Company, a corporation of Delaware
Application Mar. 15, 1957, Ser. No. 646,956, which is a continuation of application Ser. No. 389,136, Oct. 29, 1953. Divided and this application Jan. 30, 1959, Ser. No. 790,141
4 Claims. (Cl. 340—15)

The present invention relates to a device for preparing seismic cross sections from variable density photographic seismic records. This application is a division of copending patent application Serial No. 646,956, filed March 15, 1957 in the name of Edwin H. Meier, James J. Roark, Jesse D. Skelton, and Gerald M. Webster which in turn is a continuation of application Serial No. 389,136, filed October 29, 1953, now abandoned. In particular, it relates to a device for transferring such seismic records a trace at a time to a second record medium where the records may be arranged in side-by-side relation while imparting to each trace desired corrections for differences in elevation and differences in thickness of the weathered layer at each detection point, and the like. A particular feature of the device comprises means for incorporating an automatic correction for spread, i.e., an allowance for the added travel time required for waves to travel to detection points of increasing remoteness from the seismic source.

The general method of seismic exploration wherein a seismic disturbance is initiated at a selected point in the earth and reflected seismic waves are detected at a plurality of points spread out in a desired pattern has long been known. Briefly the method consists in picking up the detected waves with sensitive detectors known as geophones, which translate the detected motion into electrical impulses, which, after amplification, are recorded on a seismograph. The conventional seismograph record comprises a paper or film carrying a plurality of wave forms or traces representative of the seismic waves that have been picked up by the individual geophones, suitably amplified, and fed to recording galvanometers. These traces are essentially rectangular coordinate graphs of geophone velocity (or displacement, or acceleration, depending on the type of geophone used) versus time. The record is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

Oscillograph records of detected seismic waves obtained as just described when made in favorable areas may often be examined visually to pick out prominent reflections which will show up as similar transients on the adjacent traces on the record. However, in many instances such reflections are difficult to pick out because of the complexity of the wave forms. It has more recently been noted that if the detected impulses are recorded in the form of variable density photographic records many more reflections can often be distinguished. Suitable means for making such variable density records are described, for example, in U.S. Patent 2,051,153 of Frank Rieber.

In making variable density seismic records, a seismic profile is run in the more or less conventional manner whereby seismic disturbances are initiated successively at a plurality of points arranged adjacent the earth's surface in a selected profile pattern and the resulting reflected seismic waves from each disturbance are detected at a plurality of points spaced from the initiating point of the seismic disturbance. The detected waves are converted into electrical impulses and recorded in the form of variable density photographic records, which are characterized by having essentially the same width throughout their length and being made up of transverse striations that vary in density in accordance with variations in the recorded signal. The impulses from the several detection points for each seismic disturbance are recorded simultaneously side-by-side in arrival time relationship much in the manner disclosed in the aforementioned Rieber patent.

It is an object of the present invention to provide apparatus for transferring variable density seismic records obtained from a selected seismic traverse onto a second recording medium while imparting to the records certain corrections so that the records may be assembled in side-by-side relation to give a photographic representation of the various detected reflections over an entire seismic section. It is another object of the invention to provide means for automatically imparting a spread correction to each trace of a seismic record while transferring it to a second recording medium.

In accordance with the present invention a variable density seismic record is projected a trace at a time to a second record medium. Means are provided to shift the film record lengthwise to incorporate computed time corrections for each trace to convert the indicated arrival times of the recorded impulses on that trace to a common datum. Means are also provided for making a continuous spread correction along the trace.

The nature and objects of the invention and the manner in which the invention may be practiced will be more clearly understood from the ensuing description when read in conjunction with the accompanying drawing in which.

Figure 1:
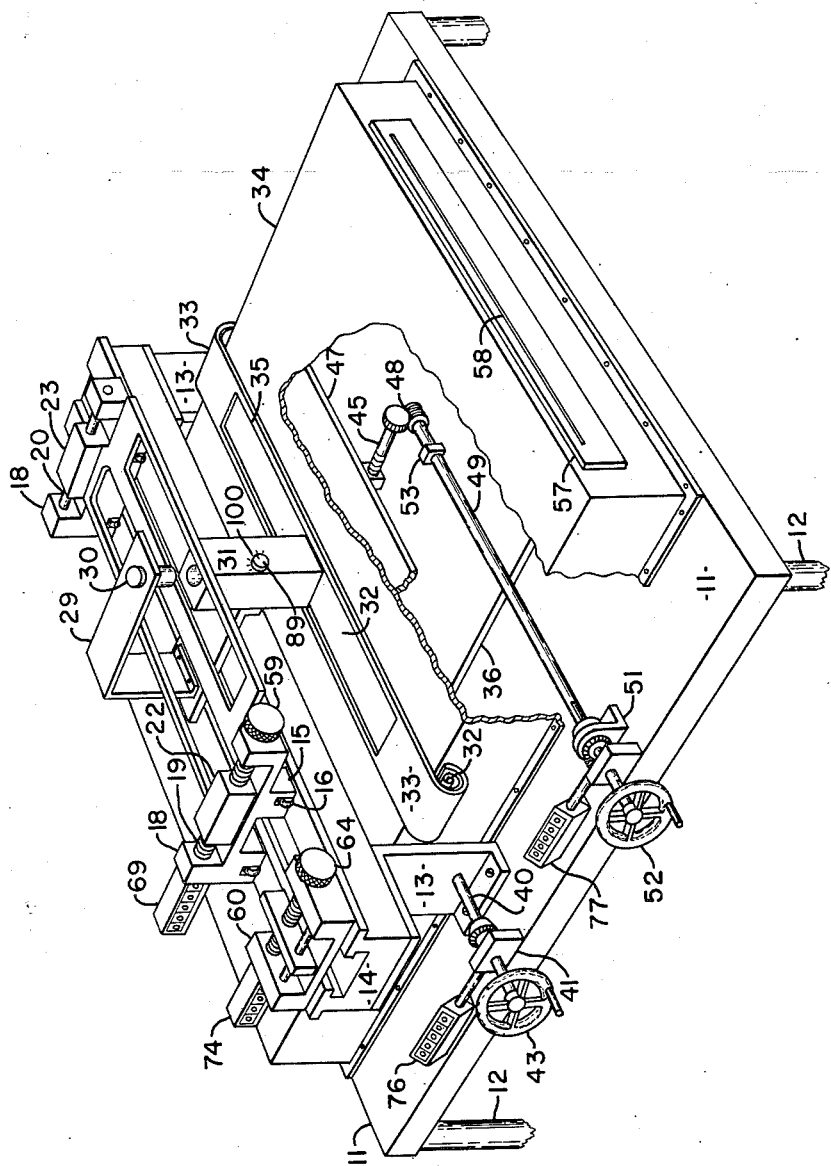
FIGURE 1 is a perspective view of one form of assembled apparatus embodying the invention with a portion broken away to disclose interior details.
Figure 2:
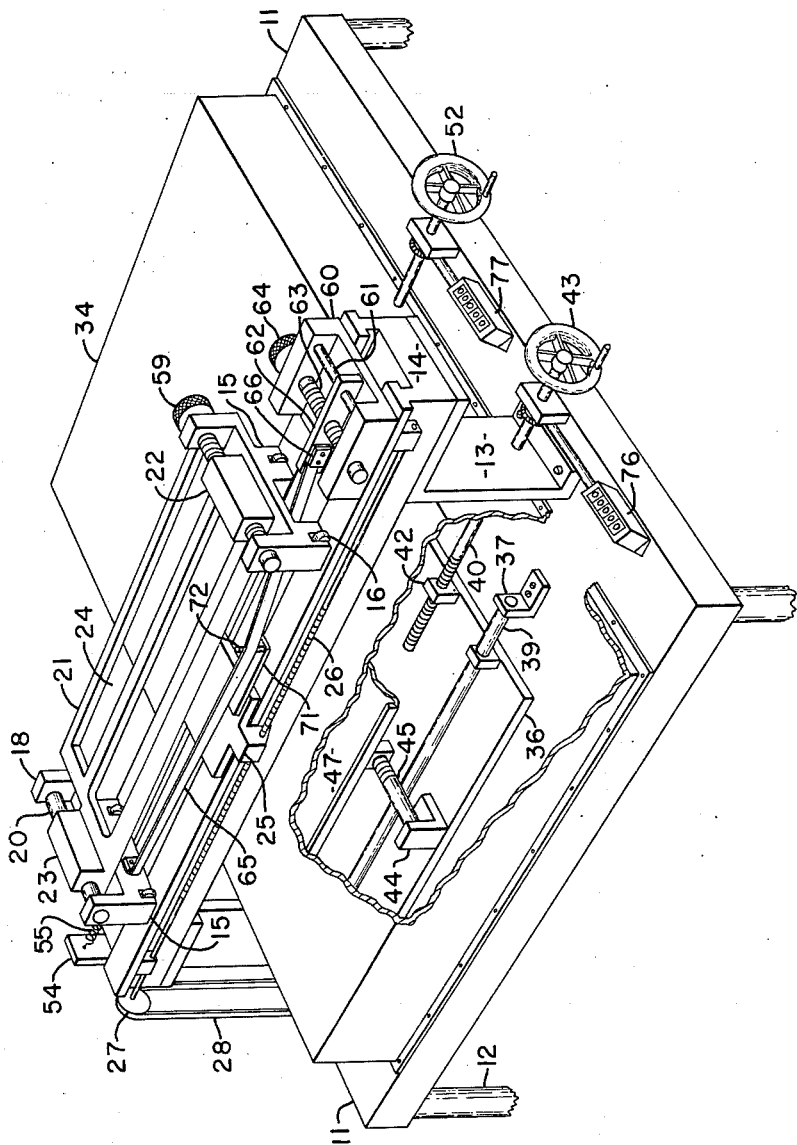
FIGURE 2 is a perspective view corresponding to FIGURE 1 but taken from a different vantage point and with portions removed to show structural details.

Referring now specifically to FIGURES 1 and 2, one embodiment of this invention will be described. Certain elements of the structure have been removed from each of these figures in order to show details that would otherwise be obscured, but any element missing from one figure will be found on the other figure. The seismic section printing device is mounted on a base 11 which may be in the form of a table supported on legs 12 of suitable height so that the device may be conveniently utilized. A pair of brackets 13 fixed to the base support a lathe bed 14 on which a spread corrector carriage 15 rests, the carriage being adapted for motion lengthwise of the lathe bed by being supported on rollers 16. The spread corrector carriage 15 has upright posts 18 at each corner. One set of the upright posts 18 receives a threaded rod 19 and the other set receives a guide pin 20. A record holder plate 21 is positioned above spread corrector carriage 15 and has raised block members 22 and 23 at each end. One of these block members 22 threadedly receives the rod 19 so that rotation of the latter by knurled knob 59 will shift the record holder plate 21 laterally with respect to carriage 15. The remaining block portion 23 slidably receives guide pin 20. A roller (not shown) positioned under block 23 supports the end of record holder plate 21 so that none of the weight of the plate is supported by guide pin 20, the latter merely guiding the lateral motion of the plate 21.

A scanner carriage 25 is supported by the lathe bed 14 and is arranged for slidable motion lengthwise of the lathe bed 14, this travel being effected by a scanner drive screw 26 driven by a pulley 27 which in turn is driven by a belt 28 run by a motor (not shown) supported underneath the base.

Fixed to the scanner carriage 25 and extending over the top of record holder plate 21 is a lamp bracket 29 (FIG. 1) supporting a lamp housing 30 above opening 24 in the record holder plate. Also held by scanner carriage 25 and positioned below record holder plate 21 and in vertical alignment with the lamp housing 30 is a lens housing 31. Fastened to the bottom edge of housing 31 is a sliding light shield 32 which fits slidably within the shield guide 33 that is fastened to a light-tight cover 34 resting on base 11. Guide 33 has a longitudinal opening 35 to permit travel of the housing 31 lengthwise of the guide. Light shield 32 is preferably made of light gauge metal such as shim stock so that the ends that would otherwise protrude when the housing 31 is at either end of its travel can roll up within the curved ends of the guide 33.

Positioned within the space defined by cover 34 and base 11 is a time correction plate 36 that is slidably supported on rods 39 by means of bearings 38, the rods 39 in turn being supported above base 11 by brackets 37 fastened to the base. The correction plate 36 can be moved lengthwise of the rods 39 by means of a threaded rod 40 that is supported by bracket 41 and that drives a nut 42 fastened to plate 36. Rod 40 may be turned by crank 43.

Slidably supported above time correction plate 36 on rods (not shown) similar to rods 39 is a film support tray 47. The rods that support tray 47 are held by brackets, similar to brackets 37, mounted on plate 36. Tray 47 may be moved in a direction transverse to that of the motion of plate 36 by means of a threaded rod 45 that drives a nut 46 that is fastened to tray 47. Rod 45 is supported by a bearing bracket 44 mounted on plate 36. In order that the positions of plate 36 and tray 47 can both be adjusted from the same side of the device, rod 45 is driven by a second rod 49 through meshing gears 48. Rod 49 is supported by bracket 51 and may be turned by crank 52. A bearing 53 mounted on tray 36 slidably receives rod 49. The box that contains the film onto which the seismic record is to be transferred may be placed on tray 47 by removing the door 57 from the front of cover 34. This operation will be discussed further in connection with FIGURE 3.

It now remains to describe the spread corrector mechanism, which is a particular feature of this invention. It will be noted that spread corrector carriage 15 is urged in the direction toward pulley 27 by means of a spring 55 held by bracket 54 that in turn is attached to the lathe bed 14. The spread corrector carriage is urged to travel in the opposite direction by a strap 65 that is attached at one end to the spread corrector carriage and at the other end to the spread corrector anchor strip 62 by means of fasteners 66. Anchor strip 62 is supported on spread corrector mounting block 60 which in turn is fastened to the lathe bed 14. The mounting block 60 is shaped in the form of an up-turned U and supports between its sides a guide pin 61 and a threaded rod 63. The anchor strip 62 is slidably held by the guide pin 61 and can be moved toward either side of the mounting block 60 by means of the threaded rod 63 when turned by knurled knob 64.

Supported on the scanner carriage 25 by means of a bracket 71 is a spread corrector pin 72 that presses against the tape 65. It will be seen that if anchor strip 62 is so positioned that the tape 65 is moved out of alignment with the direction of travel of the scanner carriage 25, the pin 72 will press against the tape and move the carriage 15 toward the mounting block 60 as the scanner carriage 25 moves in the same direction. The manner in which this action serves to impart a spread correction will be explained more fully in connection with FIGURES 4 and 5.

Figure 3:
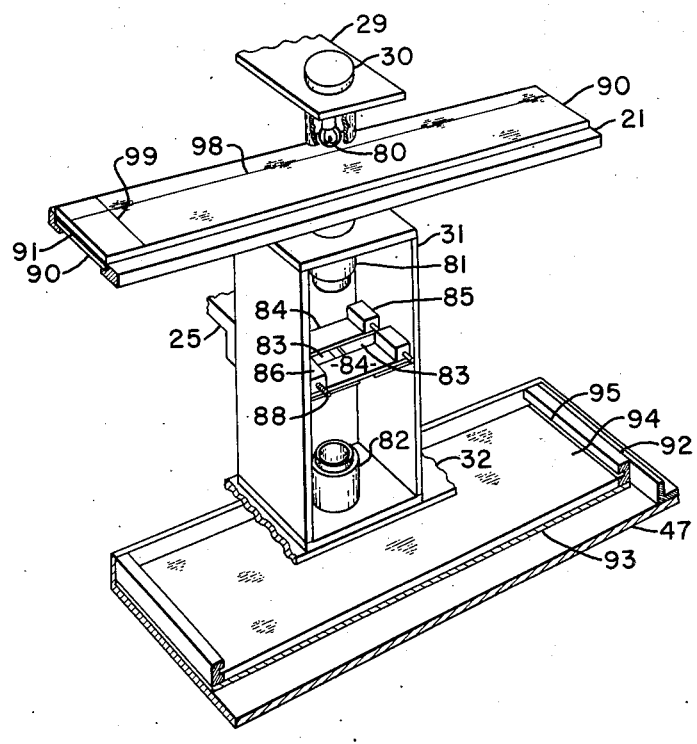
FIGURE 3 is a broken view of a portion of the assembly showing details of the optical system.

Details of the optical system are shown in FIGURE 3. A suitable lamp 80 is placed within housing 30 and directs a beam of light through the record 91 that is held between the two glass plates 90 that are placed over opening 24 and the record holder plate 21. The light passes through a pair of lenses 81 and 82 positioned adjacent the top and bottom of the lens housing 31. Two lenses are employed so that the image will not be reversed. Positioned between the two lenses 81 and 82 is a shutter and aperture arrangement comprising a pair of aperture plates 83 supported by the housing 31 and presenting a central opening. A pair of shutter plates 84 arranged at right angles to the aperture plates are slidably supported by means of blocks 85, one pair of which can move slidably on pin 87 that is supported by the front and back walls of the housing 31. The other pair of blocks 86 threadedly engage a skate screw 88 threaded at one end in the opposite direction to the threads at the other end so that as the screw 88 is turned in either direction by means of knob 89 (FIG. 1) the two plates 84 will move toward or away from each other at an equal rate. Thus, regardless of the size of the opening defined by plates 83 and 84, the opening will at all times be centered with respect to the housing 31. The image projected by the lenses 81 and 82 through an opening in shield 32 falls on the film or equivalent photographic medium 93 that is held flat within box 92 by means of a glass plate 94 placed over the film.

To place the film in position in the printer, the film is loaded in the box 92 in a dark room, the glass plate 94 is placed over the film and then an opaque slide that fits into groove 95 is placed over the glass plate, thus excluding all light from the film. The door 57 is then removed on the printer, the box 92 is inserted onto the tray 47, and the door 57 is replaced. The opaque slide (not shown) extends out beyond the box and will protrude through the slit 58 in the door 57. This slit is felt-lined so as to prevent light from entering therethrough. After the door has been replaced on the printer, the slide is removed through the slit 58 and the film is ready for the receipt of the projected images from the lens system. When it is later desired to remove the film from the printer, the above steps are reversed; namely, the opaque slide is inserted through the slit 58, the door is removed and the box is then taken out of the printer.

The operation of the printer will now be described. The seismic record that is to be transferred to the film is placed between the two glass plates 90 and the plates and film are placed in the opening 24 in the record holder plate 21. Index lines 98 and 99 are scribed in one of the glass plates 90 as a convenience in positioning the variable density record. These lines are shown in FIG. 3 in the top glass plate for ease of illustration, but it is preferred that they be scribed in the bottom glass plate for greater convenience, as it is then possible to keep the lower glass plate permanently fixed to the record holder plate. Conveniently the shot time mark on the seismic records is used as the index marker for positioning the record lengthwise of the record holder, the shot time mark being lined up with the scribed line 99. The recording of shot time as indicated by the opening of the firing circuit upon firing of the detonating cap is conventional practice with which persons skilled in the art of seismic prospecting are familiar.

Any selected trace may be lined up with the index line 98 on the glass plate 90 and the trace to be copied can then be placed in alignment with the beam from the projecting lamp by turning knob 59. A counter 69 driven by threaded rod 19 facilitates the setting of each trace. The counter 69 can be calibrated in any desired manner and conveniently is calibrated so as to indicate the width of the individual traces.

After a trace has been selected for projection, fixed time corrections are applied to that trace by shifting the film 93 lengthwise of the lathe bed. This is done by turning crank 43, the extent of the shift being measured by counting mechanism 76. Conveniently counter 76 can be calibrated for milliseconds of time correction where all of the records being handled have been made in standardized recording equipment. Here again the application of time corrections to an individual seismic record when computing seismic wave travel times is familiar to persons skilled in the art of seismic prospectng. The direct analogy between imparting a physical shift in the record for differences in wave travel time due to differences in elevation for each geophone with respect to a selected datum, correction for low velocity weathered layer thickness, and the like, and a similar mathematical correction when computing seismic records in the conventional manner will be readily apparent to such persons.

The particular portion of the film onto which each individual trace is projected is selected by turning crank 52. After a given trace has been projected, the film can be moved a selected distance laterally so that the next trace that is projected will abut the previous trace. By selecting the amount the film is moved laterally for each trace, a selected degree of vertical to horizontal exaggeration in the printed section can be obtained. The amount by which the film is moved for each trace is measured by counter 77. The latter counter is conveniently calibrated in feet or tens of feet between adjacent geophones.

In order that the adjacent traces that are projected will abut each other regardless of the selected width of the projected traces, the distance between shutter plates 84 must be selected to correspond to the amount of shift imparted for each projected trace. This is conveniently done by calibrating the scale 100 associated with the shutter mechanism so that it corresponds numerically with the indicated shift on counter 77. Before each trace is projected, another setting is made on the printer to apply the proper spread correction. This is done by turning knob 64 to shift the anchor strip 62 laterally a selected distance. The amount of shift is indicated by counter mechanism 74 which is driven by threaded rod 63. Conveniently counter 74 can be calibrated to indicate directly the distance in feet or tens of feet between the shot point and the particular geophone whose trace is being projected.

For each trace that is to be printed a spread correction is also set into the printer. As is well known in seismic computing, the spread correction makes allowance for the added time required for a wave to travel along each slant ray path from the seismic shot to the reflecting layer and back to each succeeding geophone. While the corrections other than spread correction will be constant for each individual trace of the seismic record throughout its length, the spread correction will change with time along the record because of the difference in travel angle to the deeper subsurface beds whose reflections are picked up later on the record. The spread corrector device in the printer of the present invention is adapted to apply this spread correction automatically as each trace is scanned along its length. It is merely necessary to turn knob 64 so as to shift the spread corrector anchor strip 62 a distance laterally that corresponds to the distance between the shot point and the particular geophone from which the trace being printed has been obtained. Conveniently, counter 74, which is driven by rod 63 when knob 64 is turned, can be calibrated in feet or tens of feet when the printer has been standardized with the time scale on the seismic record.

Figure 4:
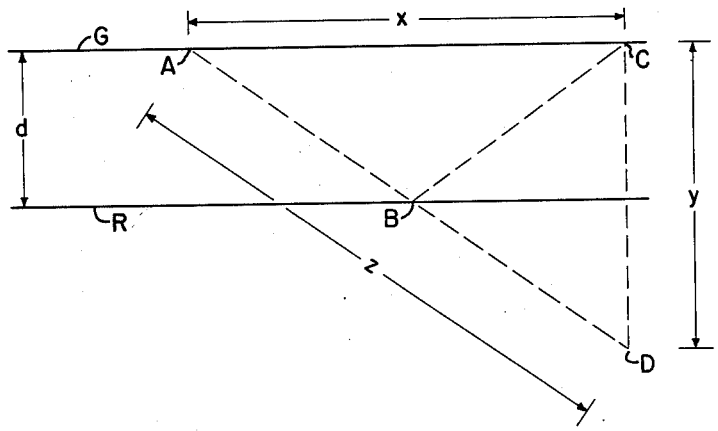
FIGURE 4 is a schematic representation of a vertical section of earth along a selected seismic profile showing the geometry involved in making the spread correction.
Figure 5:
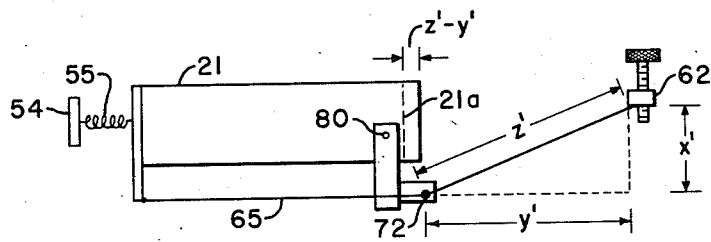
FIGURE 5 is a diagram representing the function of the continuous spread corrector device of this invention.

The manner in which the spread correction is automatically incorproated into the projected record during the scanning of the original record can be understood from a study of FIGS. 4 and 5. Referring first to FIG. 4, which is a simple geometric figure representing a vertical section of earth along a selected seismic profile, it is assumed that line G represents a selected portion of the surface of the ground with an explosive shot placed near the surface at point A and a geophone on the surface at point C. Seismic energy in traveling from the shot to the geophone as a reflected wave from a subsurface layer represented by line R at a depth $d$ takes the path A—B—C. The time of travel from the instant of detonation of the shot to the time that a reflection from subsurface R reaches point C is proportional to the distance A—B—C, whereas the actual depth of interest is represented by $d$. If a perpendicular line is drawn from point C to line R and the triangle thus defined whose hypotenuse is BC is "folded over" on line R, an enlarged triangle ACD is obtained in which the distances of interest are more clearly presented. Thus, the distance A—B—D is exactly the same as the distance A—B—C and the distance C—D is twice the distance $d$. In the triangle ACD the distance A—C, which may be represented by $x$, is equivalent to the spacing between the geophone and the shot point. The distance A—D, which may be represented by $z$, is equivalent to the length of the actual travel path of a reflected wave in traveling from point A to the reflecting layer R and then to the geophone C. Likewise, the distance C—D, which may be represented by $y$, is the distance the reflected wave would have travelled if the travel path were truly vertical. In terms of travel time, $z$ is the actual travel time for the recorded event and $y$ is the travel time to which it is desired to correct the record.

The triangle ACD can be directly applied to the spread corrector mechanism as shown in FIG. 5. Thus the distance $x$, i.e., the distance from the shot point to the geophone, will have as its equivalent in FIG. 5 the distance $x'$, which is the distance the end of tape 65 that is attached to the anchor strip 62 is displaced laterally from the straight line projection of the major portion of the tape. The distance $y'$, which will change as successive portions of the record are scanned by the lamp 80, will at all times be proportional to the distance $y$ in FIG. 4 since the pin 72 and the lamp 80 are in fixed relation to each other. It will then be seen that $z'$ in FIG. 5 must correspond to the distance $z$ in FIG. 4.

Since the tape 65 is of constant length, the shifting of anchor strip 62 laterally will cause the record holder plate 21 to be moved lengthwise of the lathe bed. When $x'$ is zero, i.e., when no lateral adjustment has been made in anchor strip 62, $y'$ and $z'$ will be identical in length and the right-hand edge of record holder plate 21 will be in the position shown by dotted line 21a. However, for a displacement $x'$ of anchor strip 62, the plate 21 will be moved lengthwise of the lathe bed against the tension of spring 55 a distance equal to length $z'$ minus length $y'$. Inasmuch as this difference is equivalent to the amount of correction that it is desired to incorporate into the record, it will be seen that the spread correction is automatically imparted for any reflection depth. Because of the fact that the distance $z'$ minus $y'$ changes as the record is scanned from one end to the other when a displacement $x'$ has been set into the printer, it is desirable to have the opening defined by the aperture plates 83 (FIG. 3) small to prevent "smearing."

After the correction has been set into the printer for a selected individual trace, as described, the lamp and the motor are turned on and the scanner carriage is driven from one end of its travel to the other, thus causing lamp 80 to project all of the portions of the selected trace onto the film or equivalent photographic medium 93. Preferably the circuit that supplies the lamp and motor is so designed that when the scanner carriage has traversed the length of its travel a relay disconnects the lamp and reverses the motor so that the scanner carriage can return to its original position without any light being projected through the record. Another relay then turns off the motor. It is also possible to arrange the circuit so that the carriage does not automatically return to its original position but that instead, when the proper switch is again closed, the motor and lamp can be actuated to scan the next trace in the opposite direction. It has been found, however, that greater uniformity can be obtained if each trace is projected with the carriage travelling in the same direction. The circuits for turning on the lamp, starting and stopping the motor, and the like, are not illustrated here as their design is a simple matter.

Use of the printer of this invention enables the preparation of an entire seismic section by printing in side-by-side relation the records from a plurality of shot points and detection stations along a selected profile, the result being a general photographic representation of the various reflecting layers.

Figure 6:
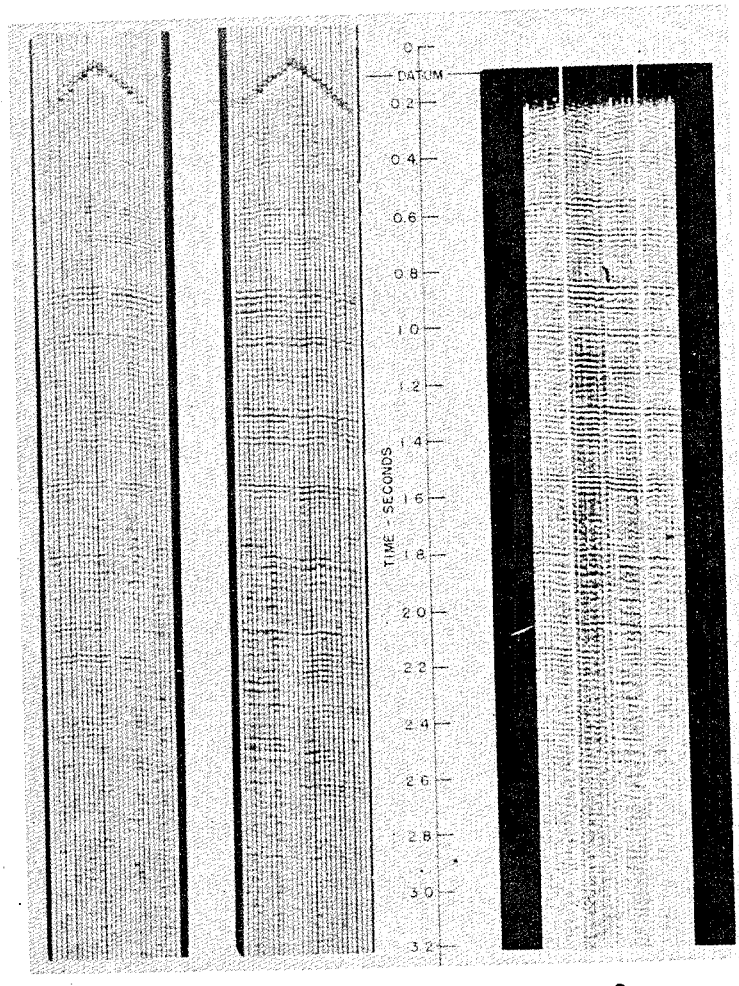
FIGURE 6 is a photographic reproduction of a pair of variable density seismic records and of a portion of a seismic section made from those records by the apparatus of the present invention.

A photographic reproduction of two original seismic records and of a portion of a seismic section prepared from these records by using a printing apparatus built in accordance with the present invention is shown in FIG. 6. To obtain the portion of the seismic section C shown on the right-hand side of the figure the two records A and B were projected a trace at a time, the proper corrections being incorporated into the printer for each trace and the traces being arranged side-by-side on the photographic medium receiving the projections. The improvement in lineup of the various reflections is readily apparent. The parallel white lines that appear in portion C of FIG. 6 were prepared by projecting a time line trace between the two center traces of each record, an opening having been punched in the film at each tenth second interval, which accounts for the evenly spaced dark spots along the time line traces. This procedure has been found to be convenient for making computations from the completed seismic section.

Although normally when using the apparatus of this invention the successive traces will be projected so that they will be placed in abutting relation, it is also possible to overlap the traces to some extent to produce a composite effect as described and claimed in copending application Serial No. 243,643 of Gerald M. Webster, filed August 25, 1951, now U.S. Patent No. 2,710,661.

It is not intended that the scope of this invention be limited to the specific embodiments thereof that have been described in the foregoing specification, as many modifications will occur to persons skilled in the art. The true scope of the invention is defined in the claims appended hereto.

What is claimed is:

1. The method of translating the traces of a variable density seismogram into a variable density seismic section wherein fixed and spread corrections are incorporated within the traces in the seismic section which comprises scanning along the length of each trace in the seismogram in a trace-by-trace sequence with a beam of light, projecting the light transmitted by the seismogram to a photographic recording medium to record each trace in a predetermined side-by-side relation on the medium, effecting predetermined longitudinal displacements between the traces recorded on the recording medium to refer all of the traces thereon to a common time datum, effecting continuous displacement of each trace on the seismogram relative to the corresponding trace on the recording medium during projection of the trace to incorporate spread time corrections within the trace on the recording medium.

2. In the system of seismic prospecting wherein a seismic disturbance is created at a shot point in the earth and the resulting seismic waves reflected by substrata are received at a plurality of detection points spaced in a profile pattern from the shot point and wherein the arrival times of the seismic waves at the detection points are recorded in the form of variable density traces arranged in a side-by-side manner and in arrival time relationship as a seismogram, the method of preparing a variable density section from the seismogram which comprises scanning along each trace of the seismogram with a beam of light in a trace-by-trace sequence, photographically recording the light transmitted by each trace of the seismogram in the form of a new variable density trace, recording all of the new traces in a predetermined side-by-side relation, longitudinally displacing each new trace to refer all times on the traces to a common datum, analogically subtracting the time interval Y for a seismic wave to travel the vertical distance from the datum to the reflection point and return from the time interval Z for a seismic wave to travel from the shot point referred to datum to the reflection point and thence to the detector referred to datum, continuously displacing each trace of the seismogram, simultaneously while scanning the trace, a distance corresponding to the time interval Z minus Y to spread correct each new trace as it is photographically recorded.

3. A method of translating the traces of a variable-density seismogram into a corrected variable-density seismic section which comprises scanning along the length of each trace in the seismogram in a trace-by-trace sequence with a beam of light, projecting the portion of the light beam transmitted through the seismogram to a photographic recording medium, recording each projected trace in a preselected side-by-side relation on the recording medium, effecting a longitudinal displacement between said seismogram and said section prior to the scanning and projection of each seismogram trace to incorporate a fixed time correction within the corresponding trace recorded on the recording medium, and effecting a continuous displacement of the seismogram during the scanning and projection of each seismogram trace to spread correct the corresponding trace on the recording medium.

4. A method of preparing a variable-density, multi-trace seismic section from a multi-trace, variable-density seismogram which comprises projecting the seismogram upon a photographic recording medium by scanning along each trace with a beam of light in a trace-by-trace sequence, effecting a longitudinal displacement between the seismogram and the section prior to the projection and scanning of each trace to enter a fixed time correction within the corresponding trace on the recording medium, effecting a continuous longitudinal displacement of the seismogram simultaneously with the scan of each trace to enter a continuous spread correction along the length of the corresponding trace projected on the recording medium, and arranging said projected traces in a preselected side-by-side relation on said recording medium.

References Cited in the file of this patent

UNITED STATES PATENTS

| | | |
|---|---|---|
| 2,440,971 | Palmer | May 4, 1948 |
| 2,628,689 | Rieber | Feb. 17, 1953 |
| 2,671,375 | Boucher | Mar. 9, 1954 |
| 2,821,892 | Merten | Feb. 4, 1958 |
| 2,825,885 | Reynolds | Mar. 4, 1958 |
| 2,861,507 | Palmer | Nov. 25, 1958 |
| 2,898,574 | Palmer | Aug. 4, 1959 |
| 2,932,001 | Reynolds | Apr. 5, 1960 |